(12) United States Patent
Yuksel (10) Patent No.: US 12,297,815 B2
(45) Date of Patent: May 13, 2025

(54) SYSTEM AND METHOD FOR PROVIDING HOME ENERGY

(71) Applicant: Edip Yuksel, Cincinnati, OH (US)

(72) Inventor: Edip Yuksel, Cincinnati, OH (US)

( * ) Notice: Subject to any disclaimer, the term of this patent is extended or adjusted under 35 U.S.C. 154(b) by 0 days.

(21) Appl. No.: 18/216,999

(22) Filed: Jun. 30, 2023

(65) Prior Publication Data

US 2025/0003386 A1     Jan. 2, 2025

(51) Int. Cl.
| | |
|---|---|
| F03D 9/25 | (2016.01) |
| F03D 5/04 | (2006.01) |
| F03D 9/45 | (2016.01) |
| F03D 15/00 | (2016.01) |
| H02K 7/116 | (2006.01) |
| H02K 7/18 | (2006.01) |

(52) U.S. Cl.
CPC ............ *F03D 9/25* (2016.05); *F03D 5/04* (2013.01); *F03D 9/45* (2016.05); *F03D 15/207* (2023.08); *H02K 7/116* (2013.01); *H02K 7/183* (2013.01); *F05B 2240/9112* (2013.01)

(58) Field of Classification Search
CPC . F03D 9/25; F03D 9/45; F03D 15/207; F03D 5/04; H02K 7/116; H02K 7/183
See application file for complete search history.

(56) References Cited

U.S. PATENT DOCUMENTS

| | | | | |
|---|---|---|---|---|
| 4,275,534 A * | 6/1981 | Porter | ............... | E04B 1/24 |
| | | | | 52/653.1 |
| 4,396,843 A * | 8/1983 | Martinez Parra | ......... | F03D 3/00 |
| | | | | 415/173.1 |
| 2008/0191489 A1 * | 8/2008 | Harvey | ............... | F03D 9/25 |
| | | | | 290/55 |
| 2008/0286112 A1 * | 11/2008 | Rowan | ............... | F03D 80/70 |
| | | | | 416/223 R |
| 2010/0247302 A1 * | 9/2010 | Suma | ............... | F03D 9/007 |
| | | | | 415/182.1 |
| 2011/0121575 A1 * | 5/2011 | Anetrini | ............... | H02S 10/12 |
| | | | | 290/55 |
| 2011/0176919 A1 * | 7/2011 | Coffey | ............... | F03D 3/005 |
| | | | | 416/124 |

OTHER PUBLICATIONS

Written Opinion of the International Searching Authority dated Jul. 25, 2024.

* cited by examiner

*Primary Examiner* — Sean Gugger
(74) *Attorney, Agent, or Firm* — Jacob M. Ward; Ward Law Office LLC (57) ABSTRACT

A vertical axis wind turbine (VAWT) is provided for structural support and aesthetic integration with residential homes and buildings. The turbine is coupled to a substantially circular track, located proximal to its periphery, which at least partially supports the turbine's weight while allowing rotation. The VAWT may function as the roof of a residential home or other conventional building type as the support structure. The number of blades can be three or five, and the turbine can be situated on buildings with polygonal shapes. The turbine may be supported on a track and may include a support overhang that extends beyond the support structure and connects to the track using a c-shaped bearing. The shaft of the turbine connects to a gear that transfers torque to one or more generators. This inventive wind generator system provides an efficient, visually appealing, and integrated solution for generating renewable energy.

20 Claims, 9 Drawing Sheets

SYSTEM AND METHOD FOR PROVIDING HOME ENERGY

CROSS REFERENCE TO RELATED APPLICATION

This application claims benefit from U.S. Provisional Application No. 63/357,663 titled "System and Method for Providing Home Energy" and having a filing date of Jul. 1, 2023, all of which is incorporated by reference herein.

BACKGROUND OF THE INVENTION

Field of the Invention

This invention relates to a home wind generator. More specifically this invention relates to a rooftop horizontally situated turbine for converting wind energy to electrical energy.

Description of Related Art

Wind turbines work on a simple principle: instead of using electricity to make wind—like a fan—wind turbines use wind to make electricity. Wind turns the propeller-like blades of a turbine around a rotor, which spins a generator, which creates electricity. In 2021, about 10% of total electrical generation—about 400 billion kilowatt-hours of electricity—was generated from wind. There are about ten states (Wyoming, Michigan, Montana, Nebraska, South Dakota, Oklahoma, Wisconsin, Idaho, Colorado, Maryland) with mean wind power of at least 20 mph. Building houses that are both resilient to wind and generates electricity from wind, without excluding its use in conjunction with solar panels, could be a major source of clean energy.

Generally, a wind turbine includes a rotor having multiple blades. Traditional wind turbines are horizontal axis wind turbines (HAWTs) in which the rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length). In addition, the wind turbines are typically mounted on towers that are at least 60 meters in height. Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

One drawback to HAWTs is the inefficiencies caused by friction arising from the supported shaft. HAWT turbines utilize bearings for turning, and such bearings can wear out and need replacement. An additional drawback to HAWT turbines is that only the prevailing wind from a single direction can be "harnessed" at any one time to generate energy, so that the HAWT design can be inefficient, or the blades and associated gearing can be damaged in changeable or turbulent winds, due to torque. Another drawback is that HAWT wind turbines may not turn or may need mechanical assistance to begin turning, if the wind speed is too low to counter the inertia of the HAWT rotor and bearings.

More recent developments in wind turbine technology have focused on vertical axis wind turbines (VAWTs), wherein a foil or vane is mounted on a vertically supported axis. Because of their vertical axes of rotation, VAWTs do not require alignment with the direction from which the wind is blowing. Prior art VAWTs include drag-based designs that move by being pushed by the wind, and lift-based designs which move from lift that is developed by the vanes. These prior art designs suffer inefficiencies due to drag during part of the rotation, which is a consequence of the vane shapes and gearing A further drawback to the various VAWTs of the prior art is similar to those inefficiencies found in the HAWTs, namely that there is a relatively large amount of weight carried by the bearings that support vertically rotating component of the VAWTs. In addition to the loss of energy resulting from the friction between the relative components, this leads to the need to replace bearings on a regular basis.

So as to reduce the complexity and length of the Detailed Specification, and to fully establish the state of the art in certain areas of technology, Applicant(s) herein expressly incorporate(s) by reference all of the following materials identified in each numbered paragraph below. The incorporated materials are not necessarily "prior art" and Applicant(s) expressly reserve(s) the right to swear behind any of the incorporated materials.

U.S. Pat. No. 6,688,842 to Rowan and Brown
U.S. Pat. No. 7,303,369 to Boatner, Bruce
U.S. Pat. No. 6,765,309 to Tallal, et al.
U.S. Pat. No. 7,215,039 to Zambrano et al.
U.S. Pat. No. 8,120,193 to Nightingale, Christopher George Edward
U.S. Pat. No. 8,297,025 to Tuong and Melen
U.S. Pat. No. 8,648,482 to Hede et al.
U.S. Pat. No. 8,739,476 to Royer, David
U.S. Pat. No. 9,453,494 to Krippene, Brett
U.S. Pat. No. 9,951,628 to Devisch, Geert.
U.S. Pat. No. 7,518,255 to Gordon, David Hyman.
U.S. Pat. No. 8,545,298 to Paggi, Raymond E.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

BRIEF SUMMARY OF THE INVENTION

The present invention provides among other things a system for generating electricity from wind energy. The system includes a vertical axis wind turbine with a plurality of essentially horizontally situated blades with a shaft in the center that translates torque from the turbine to an electrical generator. The turbine rests atop a support structure, that may in a particular embodiment be a building such as a residential home, an office building, or other structure. A track is coupled about the periphery of the support structure to help support the weight of the turbine. The turbine is able to rotate about the fixed track on bearings. The turbine may include an overhang on each of the blades of the turbine that hangs over the edge of the support structure. A bearing may extend horizontally from the overhang and connect to the track. In an alternative embodiment, the support structure includes a groove in the top of the periphery of the support structure that houses a plurality of ball bearings as the track. The turbine blades rest on the ball bearings and rotate relative to the track when powered by wind energy.

The number of blades may be optimized for a specific application. In some embodiments, 3 or 5 blades are preferred and the shape of the external walls of the building carrying the turbine may be circular or substantially polygonal, such as hexagonal, octagonal or preferably enneadecagon (nonadecagon or 19-gon). The turbine may be substantially shaped as a dome with blades extending from the dome to create a vertical axis wind turbine. The blades may be elevated at the center, or, if flat roof is preferred for the building, the shape of the blades would be straight and parallel to the roof. The shaft of the turbine may be coupled to a gear that transfers torque from the shaft to a plurality of generators for greater efficiency.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the attached illustrative figures. In the figures, like reference numbers refer to like elements or acts throughout the figures. Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth to provide a thorough understanding of the various aspects of the invention. It will be understood, however, by those skilled in the relevant arts, that the present invention may be practiced without these specific details. In other instances, known structures and devices are shown or discussed more generally to avoid obscuring the invention. In many cases, a description of the operation is sufficient to enable one to implement the various forms of the invention, particularly when the operation is to be implemented in software. It should be noted that there are many different and alternative configurations, devices, and technologies to which the disclosed inventions may be applied. The full scope of the inventions is not limited to the examples that are described below.

In one application of the invention, a wind generator 10 is provided having a turbine 100 with a plurality of blades 102 extending in a horizontal plane from a center 104 defining an axis of rotation 105. The blades 102 can also extend in the direction of the axis of rotation 105 to varying degrees to achieve specific performance characteristic. In many embodiments, the axis or rotation is essentially vertical (a vertical-axis wind turbine—VAWT). The blade configuration may be designed to optimize the footprint of the VAWT, yaw, the noise level of the turbine, the speed of the turbine and the overall weight of the turbine.

The attack or pitch of the blades 102 may vary along the length of the blades 102 forming a twisted pitch. The angle of the pitch, or the angle of attack of the blades 102 may be fixed or may be constantly adjusted to attain optimal angle to the wind. The pitch angle may be adapted to better fit varying wind speeds and angles of attack experienced by different parts of the blade as it rotates based on factors such as the turbine's intended operating conditions, the desired power output, and the aerodynamic considerations of the blade profile. The twist may be a continuous gradual change or may have distinct sections with different pitch angles.

There may be any number of blades 102, and 3 or 5 is generally preferred. The number of blades may be adjusted considering aerodynamic efficiency, start-up and cut-in speed, structural considerations, and cost and manufacturing considerations. In general, increasing the number of blades 102 increases the overall aerodynamic efficiency of a VAWT. VAWTs with a lower number of blades 102 tend to have lower start-up and cut-in wind speeds, allowing them to generate electricity at lower wind speeds compared to VAWTs with more blades. While increasing the number of blades 102 may provide better stability and structural support, additional blades 102 also increases weight and complexity of the turbine 100.

Figure 15:
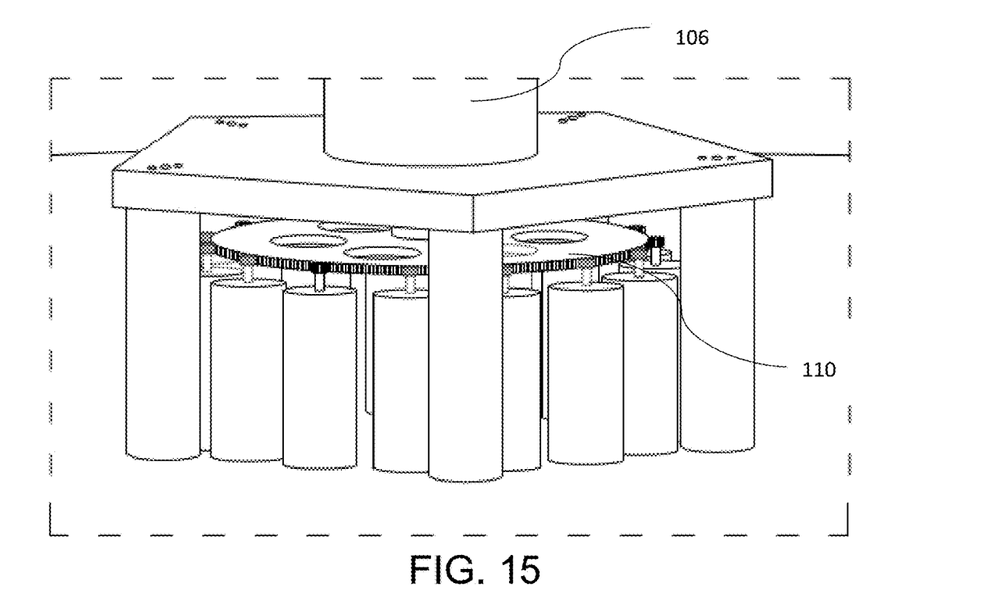
FIG. 15 depicts an overhead perspective view of a plurality of generators according to one or more embodiments of the invention.

A drive shaft 106 extends vertically from the plane of the turbine along the axis of rotation and transfers torque from the turbine 100 to a generator 108. The drive shaft may be split into multiple drive shafts 106a, 106b, 106c to translate energy to multiple generators 108a, 108b, 108c. Alternatively, a plurality of generators 108 may be coupled to the drive shaft 106 via one or more gears 110. The blades 102 may be coupled to the drive shaft via an intervening wheel (not shown). Multiple generators 108 may be used to have better control over power output. One or more of the several generators 108 may be engaged or disengaged depending on power requirements and multiple generators may provide redundancy to improve system reliability. Depending on the design and blade configuration, VAWTs may experience different wind speeds and forces along the height of the turbine and multiple generators may be used to adapt to the varying wind conditions and optimize energy harvesting at different sections of the turbine 100.

Figure 1:
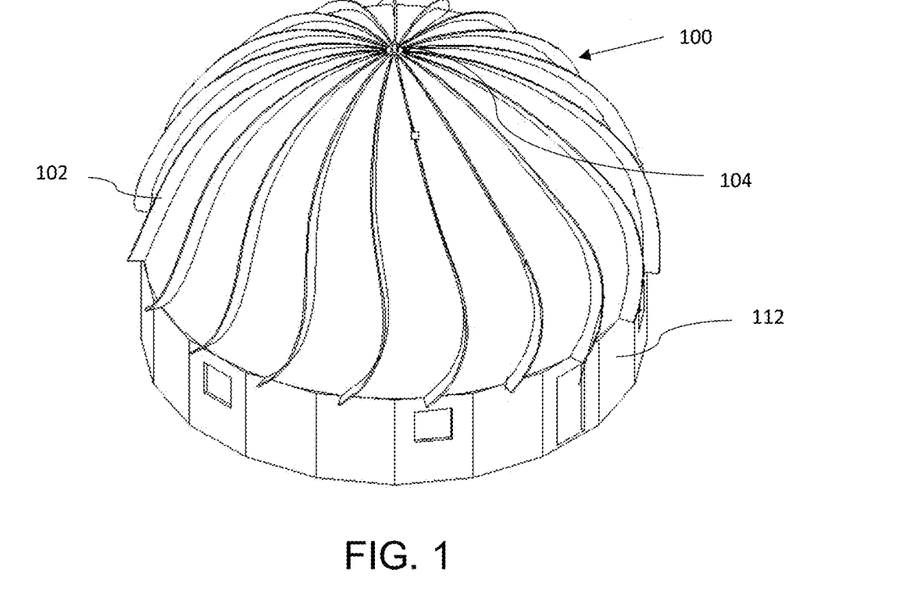
FIG. 1 depicts an overhead perspective view of a vertical axis wind turbine according to one or more embodiments of the invention.
Figure 2A:
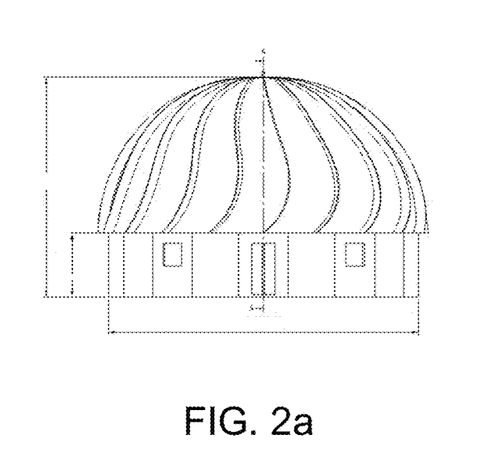
FIG. 2a depicts a front level view the embodiment of FIG. 1.
Figure 2B:
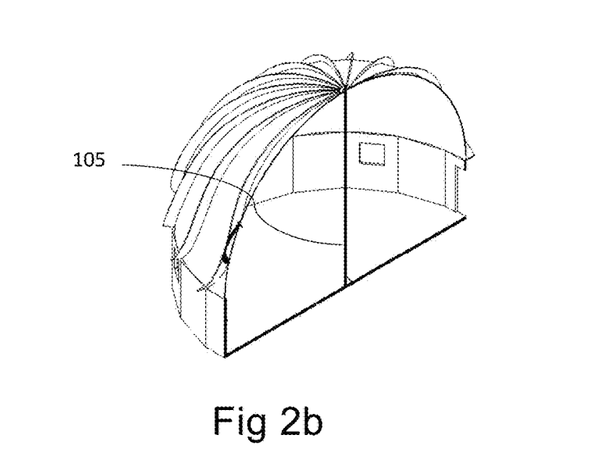
FIG. 2b depicts a rear right perspective view of a cutaway of the embodiment of FIG. 2a along cutaway line A-A.
Figure 3:
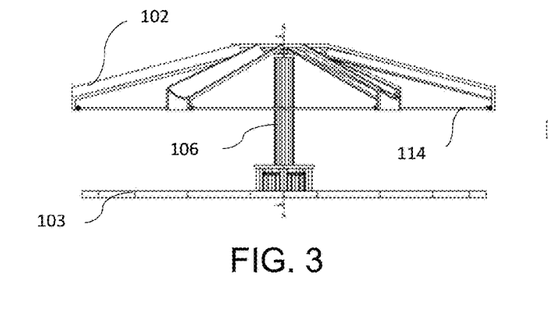
FIG. 3 depicts a front level view of a VAWT according to one or more embodiments of the invention.
Figure 4:
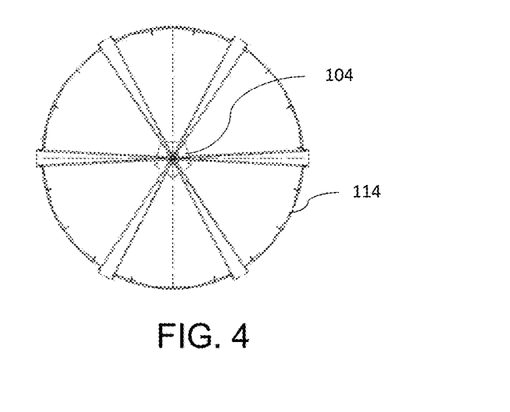
FIG. 4 depicts an overhead view of the embodiment of FIG. 3.
Figure 5:
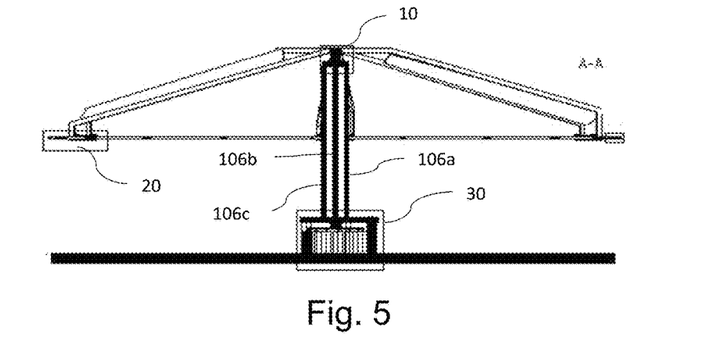
FIG. 5 depicts a side view of a cutaway of the embodiment of FIG. 3 along cutaway line A-A.
Figure 5A:
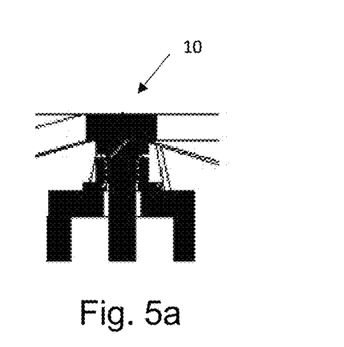
FIG. 5a depicts a closeup view of the gearbox of FIG. 5.
Figure 5B:
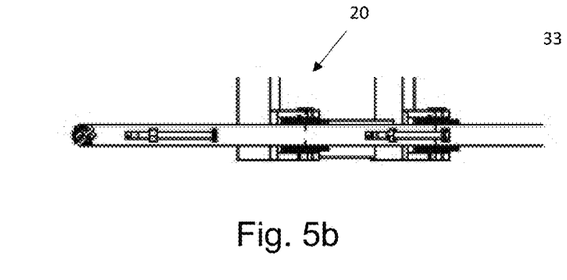
FIG. 5b depicts a closeup view of the support track of FIG. 5.
Figure 5C:
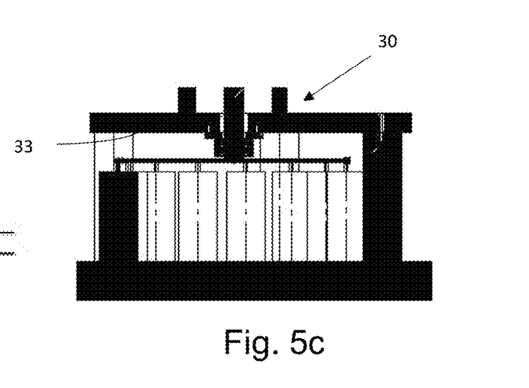
FIG. 5c depicts a closeup view of the generator housing of FIG. 5.
Figure 6:
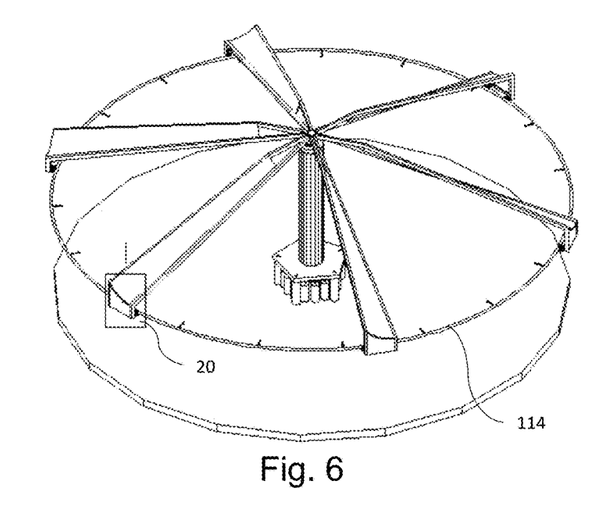
FIG. 6 depicts an overhead perspective view of one or more embodiments of the invention.
Figure 6A:
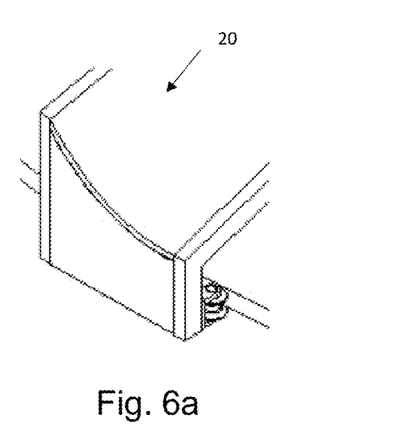
FIG. 6a is a closeup view of the support track of FIG. 6.
Figure 7:
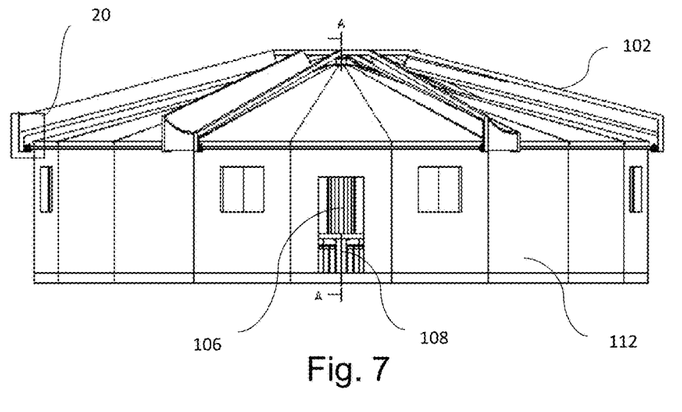
FIG. 7 depicts a front level view of a VAWT according to one or more embodiments of the invention.
Figure 7A:
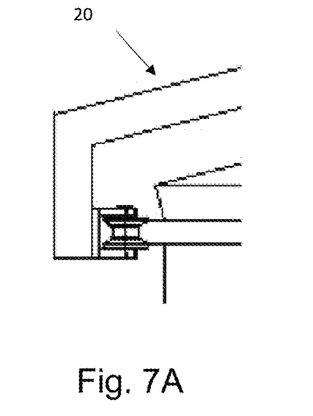
FIG. 7a depicts a closeup view of the support track of FIG. 7
Figure 8:
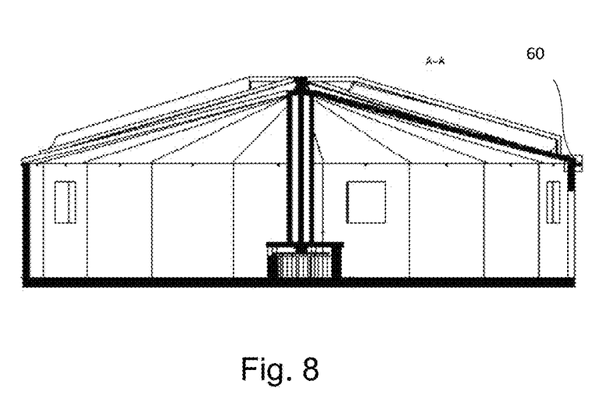
FIG. 8 depicts a side view of a cutaway of the embodiment of FIG. 7 along cutaway line A-A.
Figure 8A:
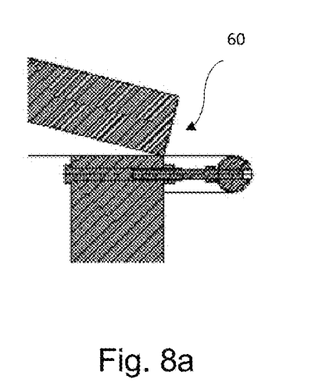
FIG. 8a depicts a closeup view of the support track of FIG. 8.
Figure 9:
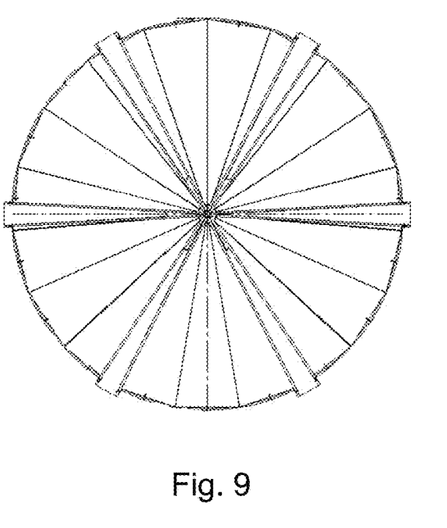
FIG. 9 depicts a direct overhead view of the VAWT of FIG. 7.
Figure 10:
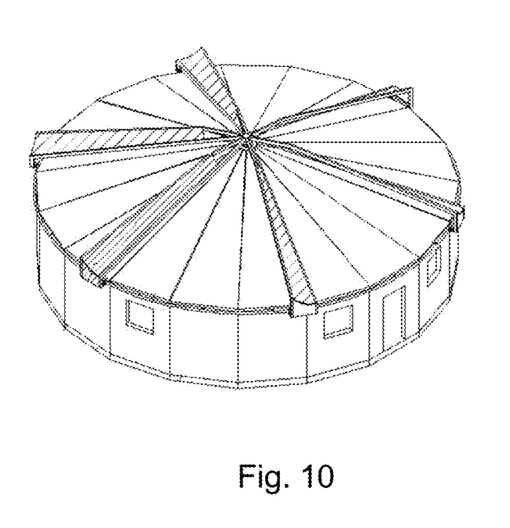
FIG. 10 depicts an overhead left view of the VAWT of FIG. 7.

Power from the blades 102 may be transferred into several drive shafts 106a, 106b, 106c via a first gearbox 10. Gearbox 10 incorporates gears or other mechanical components to divide the rotational energy from the main drive shaft into separate drive shafts for each generator 108. This allows the independent operation of each generator 108. Generators 108 may be housed in a generator housing 30 and energy from the drive shaft 106 transferred to the generators via a second gearbox 33. The first and second gearboxes 10, 33 may be used to adjust the rotational speed and torque of the turbine to match the optimal operating conditions of the generators 108, optimize energy conversion efficiency, and enable the synchronization and control of multiple generators 108.

Figure 18:
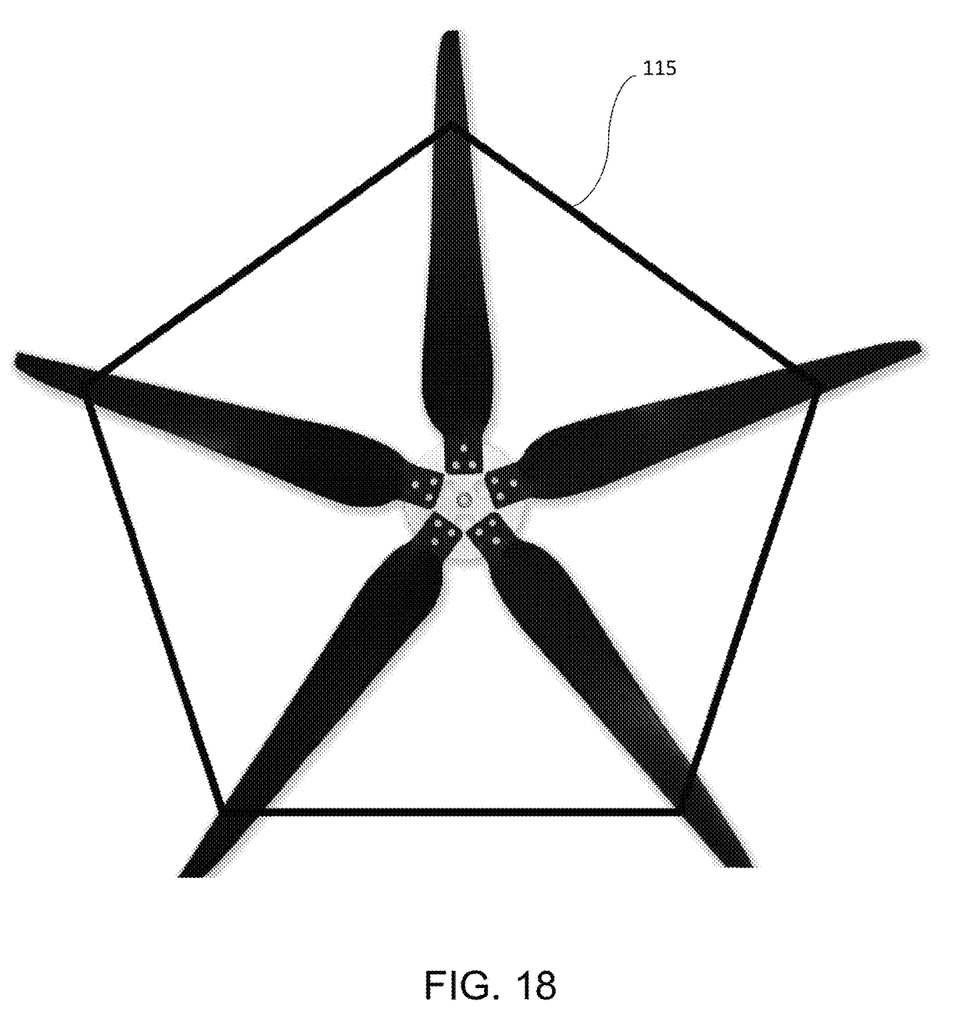
FIG. 18 depicts a direct overhead view of a turbine fan according to one or more embodiments of the invention.

The ratio of the diameter of the turbine to the height of the turbine is preferably between about 2:1 and 6:1. The stress placed on the axis of a VAWT with substantially horizontally extending blades 102 may be substantial. The turbine 100 may be supported by a support structure 112. The support structure 112 may be a building such as a residential home or other building type with the walls of the structure. The support structure 112 may provide additional support for the blades 102 through a track 114 that is coupled to the turbine 100 such that the turbine 100 moves substantially freely relative to the track 114 in the direction of rotation of the blades 102 of the turbine 100. Alternatively or additionally, the blades 102 may be reinforced with a rigid rod 115 as shown in FIG. 18.

To collect and direct the wind towards the blades on the roof, vertical and spiral grooves or channels may be carved on the support structure 112. As an alternative design, the sides of the polygon (if circular the perimeter of the circle), instead of standing 90 degrees, are tilted a few degrees, say 19 degrees, towards the axis. Straight concave half round tubes/pipes in between the vertices of the sides will direct the wind hitting the walls of the supporting structure 120 towards the blades. These tilted concave wind tubes/pipes/channels/grooves could be integrated in the edges of the panels used for the external walls of 120. In another, perhaps more efficient alternative design, the integrated tilted half windpipes are formed in spiral shape, thereby directing the wind smoothly from the entire body of the polygonal house up towards blades.

Generator 108 of the VAWT may provide energy for the structure on which it is situated, such as a home, office, storage or other structures. The VAWT may also be connected to the electrical grid to provide energy for a broader community. A plurality of generators 108 may be connected by a network to provide for a local community without access to a broader electrical grid, or may be coupled to an electrical grid to provide energy to the grid.

Figure 11:
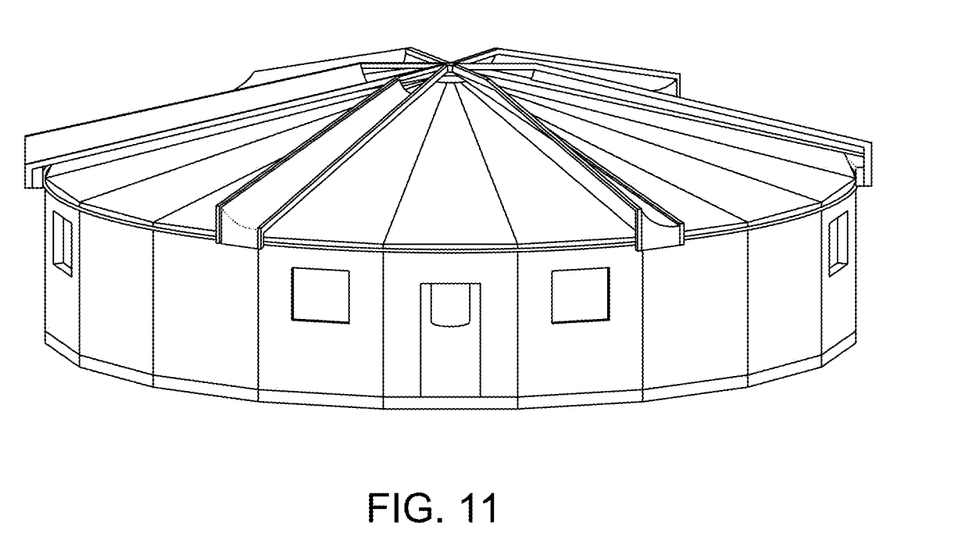
FIG. 11 depicts a front overhead perspective view of a VAWT according to one or more embodiments of the invention.
Figure 12:
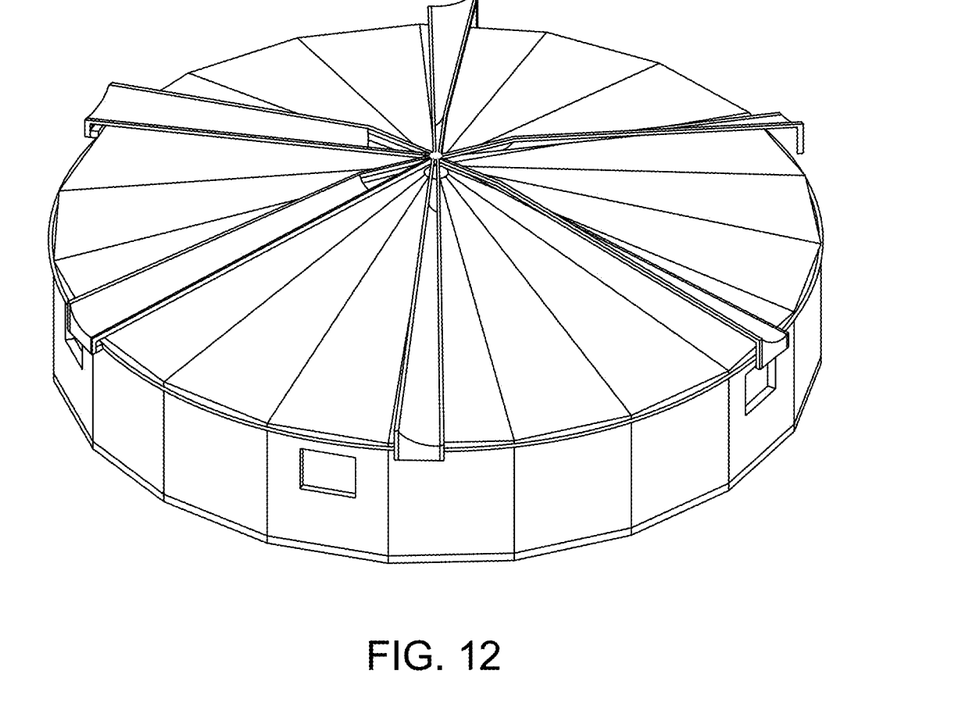
FIG. 12 depicts a rear overhead perspective view of the VAWT of FIG. 11.
Figure 13:
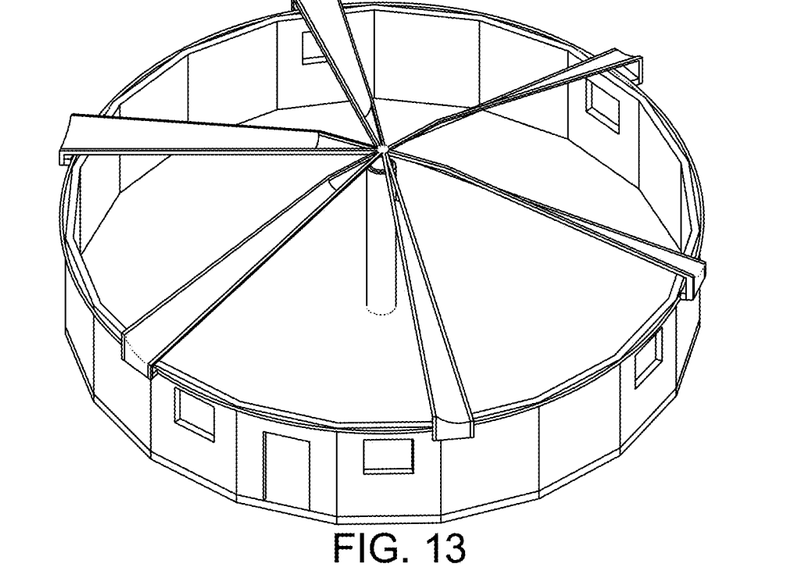
FIG. 13 depicts an overhead right perspective view of the VAWT according to FIG. 11 with the roof removed.
Figure 14:
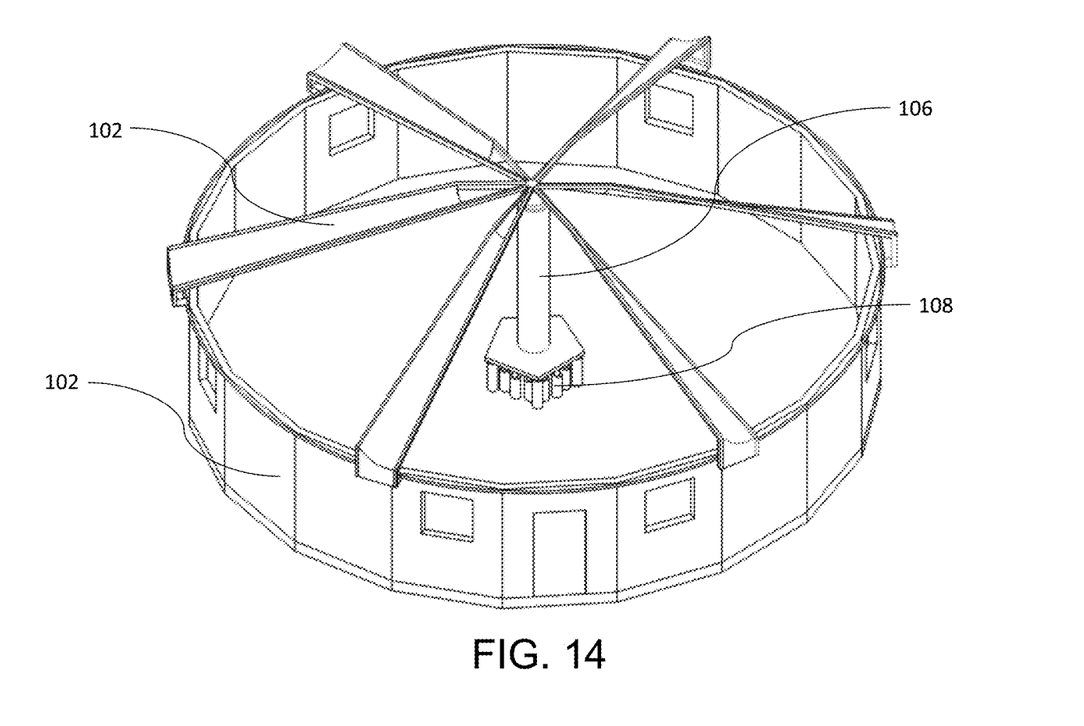
FIG. 14 depicts a front overhead perspective view of a VAWT according to one or more embodiments of the invention with the roof removed.

In a particular embodiment, the VAWT is integrated into a residential home. The turbine 100 is part of the roof 120 of the home. The roof 120 may have a any polygonal shape, as illustrated as nonadecagon (19-sided polygon). The walls of the top floor of the home may serve as the support structure 112 for turbine 100. The track 114 may be a generally circular bar that extends from the periphery of the top of the support structure 112. A bearing 122 allows for smooth rotation of the blades along the track 114.

Figure 16:
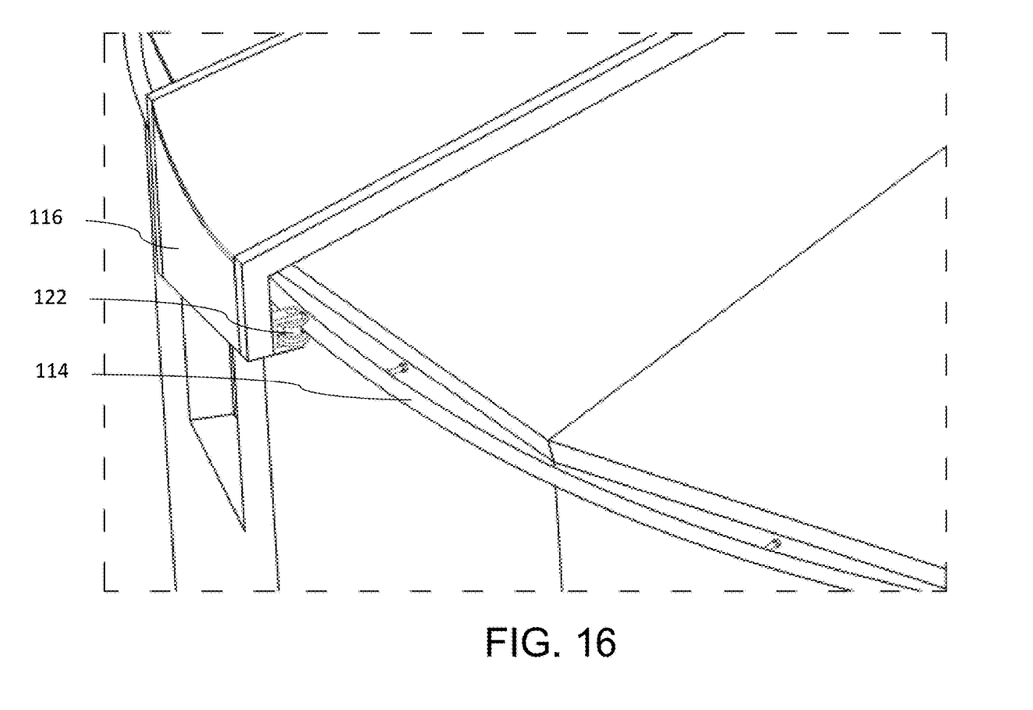
FIG. 16 depicts a closeup perspective view of the support trace of FIG. 11
Figure 17:
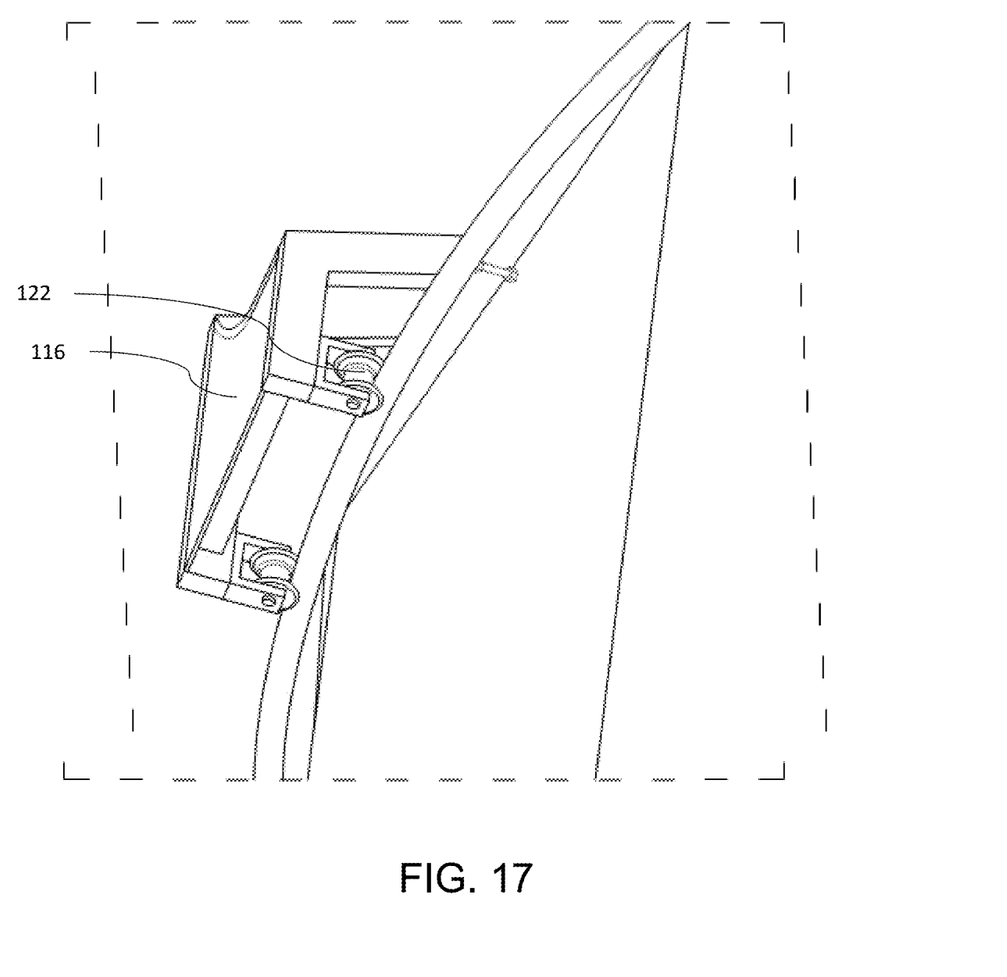
FIG. 17 depicts an underside left perspective view of the support trace of FIG. 16.

The track 114 may be above the periphery of the support structure 112 or may extend beyond the support structure 112 horizontally. The blades may be coupled to the top 124 of the support track 114 or to the side 126 of the support track. The blades 102 or the turbine 100 may include an overhang 116 that hangs over the edge of the support structure 112 and the track 114. The overhang 116 includes an overhang wall 128 that extends downward from the bottom of the blade 102 and has an outer side and an axial side 130. A bearing 122 extends from the axial side of the overhang wall 128 and couples to the track 114 through a bearing 122 to support the blade 102.

The VAWT may include solar panels integrated into the power generation system. The turbine blades may be composed of a photovoltaic material or photovoltaic panels may be placed between the turbine blades and the roof of the house to supplement the wind power generation provided by the turbine. Blades 102 may be easily removed and photovoltaic panels or a solar heating system may be installed after VAWT installation.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described and any combination of the above-described embodiments in all possible variations thereof is encompassed by the disclosure unless otherwise indicated herein or otherwise clearly contradicted by context.

I claim:

1. A wind generator for generating electricity from wind energy, comprising:
   a turbine including a plurality of blades, the turbine having a center disposed on a vertical axis of rotation, the plurality of blades configured to rotate relative to the vertical axis of rotation;
   a shaft coupled to the center of the turbine at a first end and extending vertically from the center of the turbine to a second end that is coupled to a generator; and
   a support structure configured to collect and direct the wind energy towards the plurality of blades, the support structure including one of:
      a circular side positioned around the turbine and tilted at an angle relative to the vertical axis of rotation to direct the wind energy towards the plurality of blades from each direction around the turbine, and
      a plurality of sides positioned around the turbine and tilted at an angle relative to the vertical axis of rotation to direct the wind energy towards the plurality of blades from each direction around the turbine wherein the plurality of blades is disposed parallel to a roof line of the support structure and includes an overhang that overhangs the support structure and depends below the roof line.

2. The wind generator of claim 1, wherein the support structure includes a residential home and wherein the turbine acts as at least a portion of a roof of the residential home.

3. The wind generator of claim 1, wherein the plurality of blades includes three blades.

4. The wind generator of claim 1, wherein the support structure includes a building, the turbine disposed atop the building and the building is configured with a circular or polygonal shape.

5. The wind generator of claim 1, wherein the second end is coupled to a gear that transfers torque from the shaft to the generator.

6. The wind generator of claim 1, wherein the turbine is substantially shaped as a dome.

7. The wind generator of claim 1, wherein the plurality of blades includes at least three blades.

8. The wind generator of claim 1, wherein the generator is comprised by a plurality of generators.

9. The wind generator of claim 2, wherein the plurality of blades is disposed parallel to the roof of the residential home.

10. The wind generator of claim 1, wherein the support structure includes grooves configured to direct the wind energy towards the plurality of blades.

11. The wind generator of claim 1, further including a plurality of solar panels.

12. The wind generator of claim 1, wherein each blade of the plurality of the blades further includes a pitch having an angle.

13. The wind generator of claim 12, wherein the angle of the pitch is configured to be adjustable relative to a wind speed.

14. The wind generator of claim 1, wherein the supporting component includes a track located proximal to a periphery of the turbine and coupled to the turbine to at least partially support a weight of the turbine while allowing the turbine to rotate relative to the track.

15. The wind generator of claim 14, wherein each blade of the plurality of blades includes the overhang that overhangs the support structure and wherein the track extends peripherally from the support structure and wherein the overhang is coupled to the track by a bearing, the bearing allowing the blade to rotate relative to the track.

16. The wind generator of claim 15, wherein the bearing is a c shaped bearing.

17. The wind generator of claim 14, wherein each blade of the plurality of blades includes an end coupled to the shaft and another end rotatably coupled to the track.

18. The wind generator of claim 1, wherein each blade of the plurality of blades includes an end coupled to the shaft and another end not coupled to anything.

19. The wind generator of claim 1, wherein the circular side of the support structure is disposed at an angle of 19 degrees.

20. The wind generator of claim 1, wherein the plurality of sides of the support structure is disposed at an angle of 19 degrees.

* * * * *